July 28, 1942.   C. J. YARROW   2,291,128
KNIFE AND SHARPENER ASSEMBLY
Filed Sept. 25, 1940   2 Sheets-Sheet 2
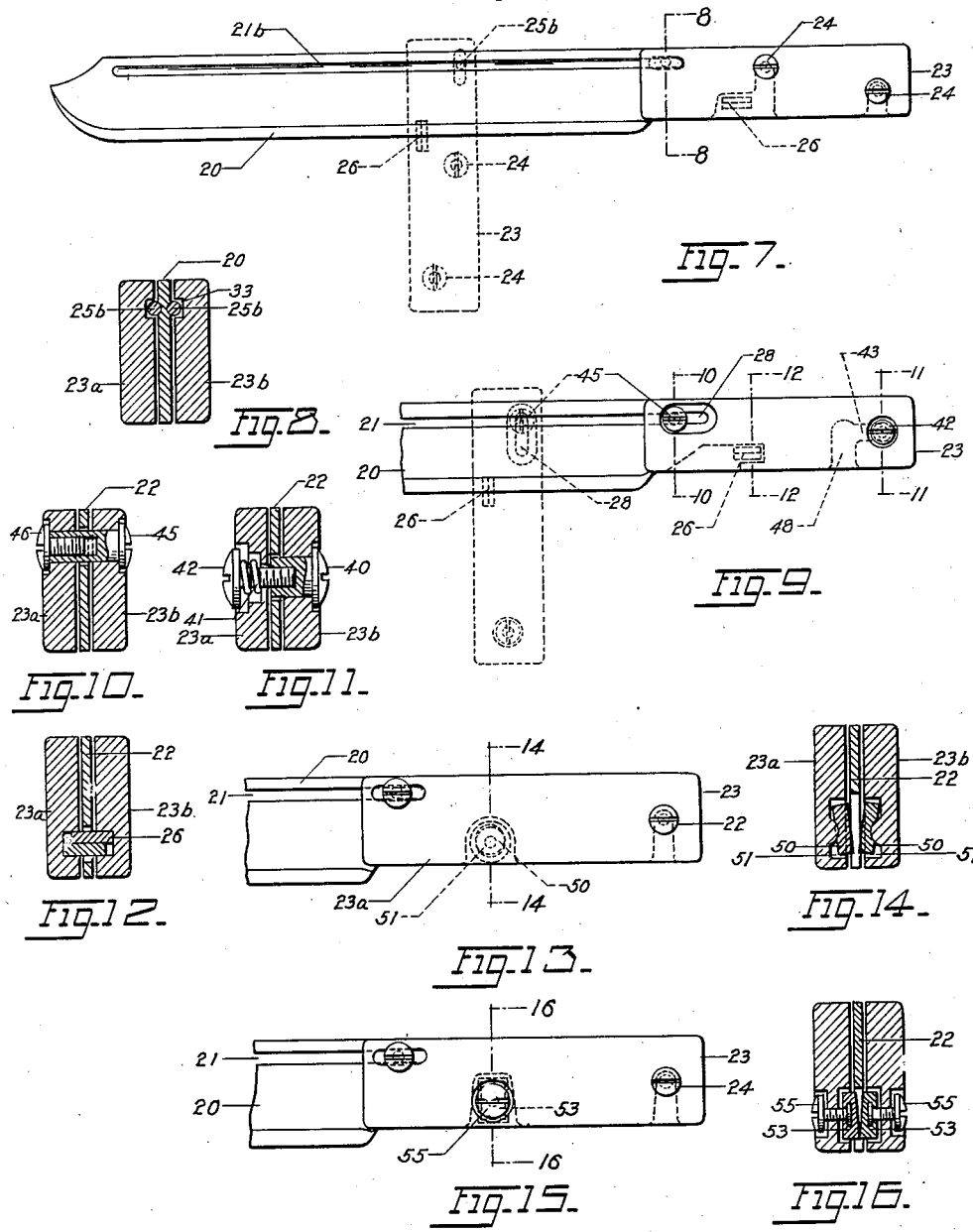
CLARENCE J. YARROW
INVENTOR.
BY *Miner L. Hartmann*
ATTORNEY.

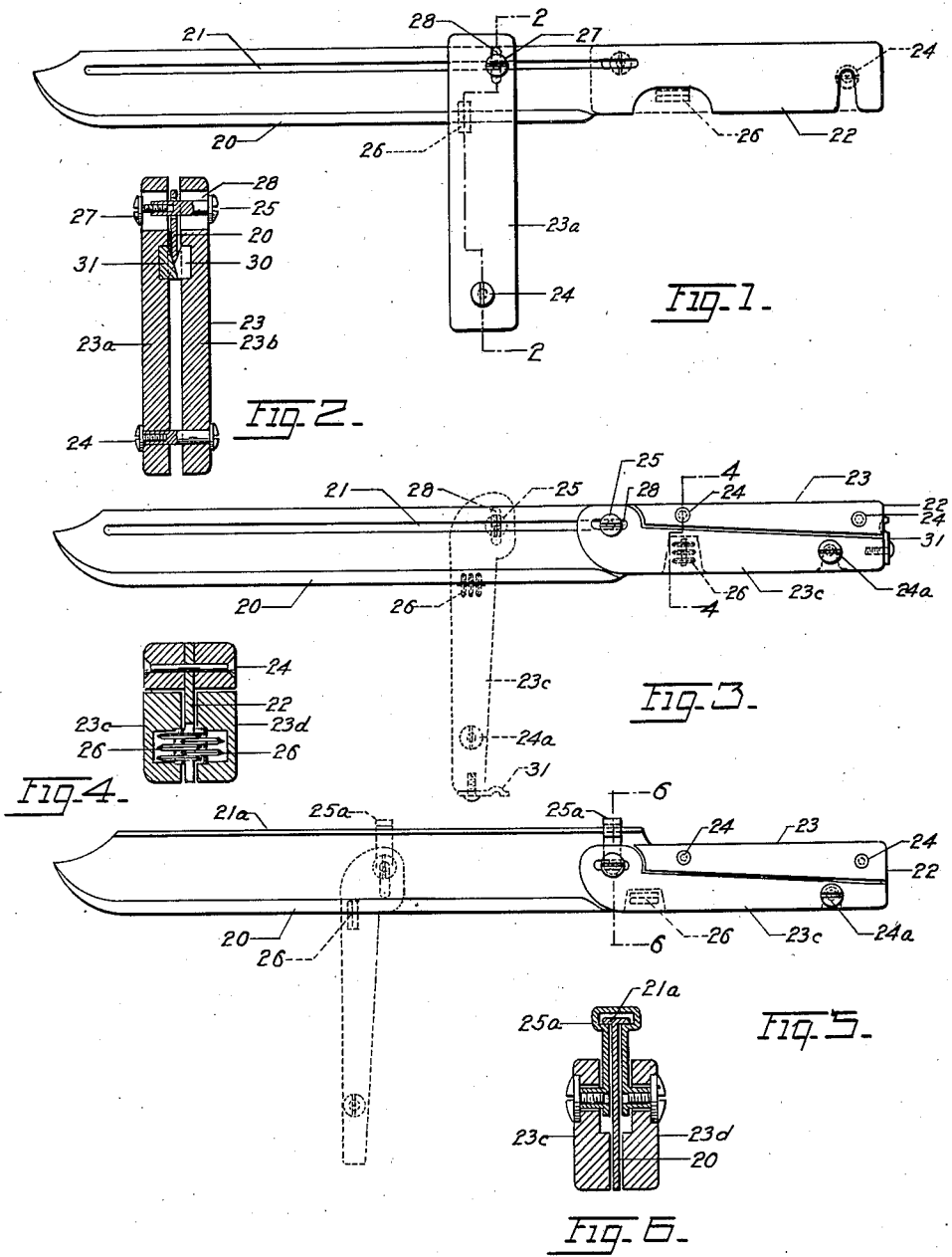

Patented July 28, 1942

2,291,128

UNITED STATES PATENT OFFICE 2,291,128

KNIFE AND SHARPENER ASSEMBLY

Clarence J. Yarrow, Los Angeles, Calif.

Application September 25, 1940, Serial No. 358,263

11 Claims. (Cl. 30—138)

This invention relates to knives, and particularly to a knife assembly including a sharpening means.

One object of the invention is to provide a knife having edge sharpening means in its handle. Another object is to provide a knife blade having guide means for an edge sharpener holder. Another object is to provide a knife handle detachably mounted to a knife haft. These and other objects will be apparent from the accompanying drawings in which:

Fig. 1 shows an elevation view of my device;

Fig. 2 is a cross-sectional view taken on the line 2—2 of Fig. 1;

Fig. 3 shows in elevation another form of my device;

Fig. 4 is a cross-sectional view taken on the line 4—4 of Fig. 3;

Fig. 5 shows in elevation another form of my invention;

Fig. 6 is a cross-sectional view on the line 6—6 of Fig. 5;

Fig. 7 shows in elevation another form of my invention;

Fig. 8 is a cross-sectional view taken on the line 8—8 of Fig. 7;

Fig. 9 shows in elevation still another form of my invention;

Fig. 10 is a cross-sectional view taken on the line 10—10 of Fig. 9;

Fig. 11 is a cross-sectional view taken on the line 11—11 of Fig. 9;

Fig. 12 is a cross-sectional view taken on the line 12—12 of Fig. 9;

Fig. 13 is an elevation view of a modified form of sharpener;

Fig. 14 is a cross-sectional view taken on the line 14—14 of Fig. 13;

Fig. 15 is an elevation view of another form of sharpener;

Fig. 16 is a cross-sectional view taken on the line 16—16 of Fig. 15.

In general, my invention consists of a knife blade which is provided with a longitudinal guide-way, a haft to which a handle or a portion of the handle may be detachably fastened, a handle or portion of a handle which is provided with a sharpening device which may be brought against the cutting edge of the blade after releasing the handle or handle portion from the haft, and also provided at the end nearest the blade with means to engage the guide-way so that the handle and its sharpening device may be moved parallel to the blade to sharpen the edge.

Referring to the drawings, the knife assembly consists of a blade 20 having a guideway 21 running substantially the full length and substantially parallel to the cutting edge, but removed from it, a haft 22 preferably integral with the blade, a handle 23, means 24 for detachably fastening the handle to the haft, means 25 for engagement of the handle with the guideway 21, and an edge sharpening device 26 attached to the handle 23 and disposed relative to the guideway 21 and the engaging means 25 so that it sharpens the knife's cutting edge when moved in contact therewith. In Figs. 1 and 2, the handle 23 consists of the two halves 23a and 23b, between which the haft 22 is enclosed when the assembly is in the normal position for use as a cutting tool. The pivot pin 25 internally threaded to engage a headed screw 27 passes through the slot 21 in the blade 20 disposed between the handle halves 23a and 23b, and through slots 28 in the handle halves, the latter slots being positioned parallel to the blade slot when the assembly is in normal cutting position, and substantially at right angles thereto when the handle serves as a holder for the sharpening device 26. The slots 28 in the handle parts permit pressure of the blade against the sharpening device and allows for the change in width of the blade with wear.

The sharpening device 26 may be of any suitable arrangement. As shown it consists of two hardened metal wedges 30 and 31, each one set in a half handle 23a or 23b, and so disposed that when assembled they are adjacent and their inner edges form a V-shaped notch through which the knife blade may be drawn to sharpen it. Other forms of sharpeners may also be used such as hardened metal disks, grooved surfaces or abrasive stones and disks.

Instead of employing the entire handle as a sharpener holder or mounting, a portion of each half handle may be permanently fixed to either side of the haft, as shown in Figs. 3 and 4. In this modification, the sharpener device 26 is mounted in a detachable portion of the handle consisting of handle portions 23c and 23d, held together by the rivet or bolt 24a at the free end, with a guide engaging means 25 at the opposite end, and a sharpening device 26 enclosed between or mounted in the two halves, disposed so that the blade may be sharpened when moved in contact therewith. In this form, the sharpening device may also be of any suitable form, that shown consisting of a group of disks with hard sharpened edges, alternate disks being mounted loosely for rotation on two shafts placed apart. The fixed portions of the handle halves are attached to the haft by bolts or rivets 24, and a spring catch 31 is provided to hold the movable part to the fixed part in normal handle position. The blade 20 is provided with a lengthwise slot 21 as in the form shown in Fig. 1. When it is desired to sharpen the edge, the detachable handle portion is released at the spring catch 31, and rotated to a position approximately at right angles to the blade and haft. The blade edge is sharpened by moving the detachable handle portion lengthwise of the blade with the edge in contact with the sharpener, the slot 21 coacting with the engaging means 25 to keep the parts in operative relation. The slot 28 is provided to permit vertical adjustment of the blade against the sharpener.

While in the forms of my device shown in Figs. 1 and 3 a slot 21 in the blade has been provided, other forms of guide-ways may be used. In Figs. 5 and 6 is represented another form in which the blade is not slotted, but is provided with an overturned back edge which forms with the blade proper a T-shaped guide-way 21a. The engaging means 25a in this form is a metal stirrup pivoted to each half handle portion, and shaped to conform to the T shaped back of the blade and serve as a guide engaging means.

Another form of guide-way is shown in Figs. 7 and 8. Grooves 21b are provided on one or both sides of the blade near the back and extending substantially parallel to the cutting edge; and, acting as engaging means for this type of guideway, steel balls 25b are placed in each groove, the handle halves 23a and 23b being provided with cooperating grooves 33 on the inner surfaces. In this arrangement it is desirable to have more than one bolt holding the handle halves to the hasp, and in order that the balls will not fall out of the grooves after the bolts are loosened to release the hasp from the handle, the bolts may be tightened again before starting the sharpening operation, or preferably a spring-tensioned bolt may be used.

A preferred arrangement for attaching the handle to the hasp is shown in Figs. 9, 10, 11, and 12. The general arrangement is similar to that shown in Figs. 1 and 2. The means for detachably fastening the handle 23 to the haft 22 consists of a headed pin 40 provided with an interior thread into which is engaged a headed screw 42. A compression spring 41 is provided beneath the head of the screw 42. In the assembly, in closed position to serve in the usual form as a cutting tool, the inner end of the pin 40 engages a hole of only slightly larger size in the haft, the spring 41 under the screw head 42 holding the pin in this position. When the head of screw 42 is pressed, the pin 40 is disengaged from the hole in the haft, and the handle may be moved for a short distance parallel to the haft, following a connecting groove 43 therein; the diameter of the screw 42 being smaller than the pin 40 it will slide in the slot 43. During this parallel movement the engaging means, which in this form is a headed pin 45 having a headed screw opposite (as shown in Fig. 10) will also slide in its slot 28, and the outer end of the handle is released for ninety degree rotation to sharpening position, when the screw 42 passes through the opening 48 in the haft 22.

Another form of sharpening device for use in the handle of my assembly is shown in Figs. 13 and 14. Abrasive disks 50 are provided, located opposite in the depression 51 in the inner surfaces of the handle halves 23a and 23b. A projection from the bottom of each of these holes or depressions 51 serves as a kind of axis for the disks, so that when the knife edge is pulled between them, the disks are self-adjusted to form a V-shaped opening for sharpening the edge of the blade, and as the disks are free to rotate, fresh cutting surfaces are exposed to the blade. Still another form of my sharpening device is shown in Figs. 15 and 16, in which abrasive plates 53 are set in depressions in the handle halves, and their position relative to each other is adjustable by means of the screws 55 threaded in the handle halves.

I prefer to make the handle halves of transparent material such as synthetic resins, as the motions involved in sharpening the blade edge may be better controlled when the coacting parts are visible. Transparent handles also make apparent any uncleanly condition of the assembly. One of the advantages of my assembly is the ease with which it may be disassembled, for cleaning or replacement of sharpening devices or other parts. The other advantages of my knife and sharpener assembly will be apparent to those familiar with this art.

While I have shown several forms of my invention, many modifications are possible and my invention is not to be restricted except insofar as is necessitated by the prior art and by the spirit of the appended claims.

I claim:

1. A knife assembly comprising a blade having a lengthwise guide-way, a haft for said blade removably attachable to a handle, a handle provided with pivotal engaging means at its inner end, said engaging means cooperating with said guide-way to at times direct the blade's edge against sharpening means, a sharpening means supported by said handle, and means for detachably fastening the free end of the handle to the haft.

2. A knife assembly comprising a blade having a lengthwise groove, a haft for said blade removably attachable to a handle, a handle provided with engaging means cooperating with said groove, a sharpening means supported by said handle, and means for detachably fastening the handle to the haft.

3. A knife assembly comprising a blade having a ridged back edge adapted to guide the blade in lengthwise movement, a haft for said blade removably attachable to a handle, a handle provided with engaging means cooperating with said ridged back edge, a sharpening means supported by said handle, and means for detachably fastening the handle to the haft.

4. A knife assembly comprising a blade having a lengthwise slot, a haft for said blade removably attachable to a handle, a handle provided with engaging means cooperating with said slot for lengthwise movement, a sharpening means supported by said handle, and means for detachably fastening the handle to the haft.

5. A knife assembly comprising a blade having a lengthwise slot, a haft for said blade removably attachable to the handle, a handle provided with pivot means therethrough adjacent the inner blade end and engaged in said slot, blade sharpening means supported by said handle, and means for detachably fastening the outer end of the handle to the haft.

6. A knife assembly comprising a blade having a ridged back edge adapted to engage the blade in lengthwise movement, a haft for said blade removably attachable to a handle, a handle, a stirrup pivoted at its ends to said handle cooperating with said ridged back edge, sharpening means supported by said handle, and means for detachably fastening the outer end of the handle to the haft.

7. A knife assembly comprising a blade having a guide-way for lengthwise sliding movement, a haft for said blade, a fixed handle portion attached along the back edge of said haft, a movable handle portion provided with pivotal engaging means normally disposed adjacent the inner blade end, said engaging means during sharpening operations cooperating with said guide-way to direct the blade's edge against sharpening means, sharpening means supported by said movable portion of the handle, and means for detachably fastening the outer end of the movable handle portion to said haft.

8. A knife assembly comprising a blade having a ridged back edge adapted to guide the blade in lengthwise movement, a haft for said blade, a fixed handle portion attached to the back edge of said haft, a movable handle portion provided with a pivoted stirrup adjacent the inner blade end and engaged over said ridged back edge, sharpening means supported by said movable handle portion, and means for detachably fastening the outer end of the movable handle portion to said haft.

9. A knife assembly comprising a blade having a lengthwise slot, a haft for said blade, a fixed handle portion attached to said haft, a movable handle portion provided with pivot means therethrough adjacent the inner blade end and engaged in said slot, sharpening means supported by said movable handle portion, and means for detachably fastening the outer end of the movable handle portion to said haft.

10. A knife assembly comprising a blade having a lengthwise groove, a haft for said blade, a fixed handle portion attached to said haft, a movable handle portion provided with balls means adjacent the inner blade end and engaged in said groove, sharpening means supported by said movable handle portion, and means for detachably fastening the outer end of the movable handle portion to said haft.

11. In a knife having a blade and haft slotted to fit an attaching pin with a pair of handles removably attached to the sides of the haft, an attaching means for said handles comprising an internally threaded pin having a head, an externally threaded headed screw fitting in said threaded pin, and a compressed spring under said screw head, the pin extending only through one handle and through said slotted haft, the headed screw extending normally only through the opposing handle and engaging the threads of said pin, said screw being adapted when pressed at its head to force the pin out of engagement with the haft whereby said slotted haft may be disengaged from said handles.

CLARENCE J. YARROW.